US010106314B2

(12) United States Patent
Wnuk

(10) Patent No.: US 10,106,314 B2
(45) Date of Patent: Oct. 23, 2018

(54) HOLDER FOR SWEETS

(71) Applicant: Qual Pak SC Piotr Wnuk Mariola Wnuk, Konstancin Jeziorna (PL)

(72) Inventor: Piotr Wnuk, Konstancin Jeziorna (PL)

(73) Assignee: Qual Pak SC Piort Wnuk Mariola Wnuk, Konstancin Jeziorna (PL)

(*) Notice: Subject to any disclaimer, the term of this patent is extended or adjusted under 35 U.S.C. 154(b) by 40 days.

(21) Appl. No.: 15/261,793

(22) Filed: Sep. 9, 2016

(65) Prior Publication Data

US 2017/0121099 A1 May 4, 2017

(30) Foreign Application Priority Data

Oct. 28, 2015 (EP) .................................... 15461571

(51) Int. Cl.

| | |
|---|---|
| ***B65D 85/60*** | (2006.01) |
| ***B65D 25/28*** | (2006.01) |
| ***A23G 3/28*** | (2006.01) |
| ***B65D 1/36*** | (2006.01) |
| ***B65D 65/16*** | (2006.01) |

(52) U.S. Cl.

CPC ............... *B65D 85/60* (2013.01); *A23G 3/28* (2013.01); *B65D 1/36* (2013.01); *B65D 25/28* (2013.01); *B65D 65/16* (2013.01)

(58) Field of Classification Search

CPC .......... B65D 85/60; B65D 1/36; B65D 25/28; B65D 65/16; A23G 3/28

USPC .................................................. 206/217, 457

See application file for complete search history.

(56) References Cited

U.S. PATENT DOCUMENTS

| | | | | | |
|---|---|---|---|---|---|
| 2,240,020 | A * | 4/1941 | Raiser | A47G 19/065 | 206/501 |
| 2,561,022 | A * | 7/1951 | Jones | A47G 19/02 | 220/23.6 |
| 2,948,452 | A * | 8/1960 | Grogan | A23G 9/503 | 215/392 |
| 5,180,079 | A * | 1/1993 | Jeng | A47G 19/065 | 206/217 |
| 5,551,570 | A * | 9/1996 | Shaffer | B65D 67/00 | 206/223 |
| 5,580,037 | A * | 12/1996 | Gore | A47G 19/02 | 220/574.1 |
| 6,418,662 | B2 * | 7/2002 | Weder | B65D 75/54 | 47/72 |

(Continued)

FOREIGN PATENT DOCUMENTS

| | | | |
|---|---|---|---|
| DE | 297 10 902 | U1 | 9/1997 |
| EM | 002589812-0002 | A1 | 12/2014 |

(Continued)

OTHER PUBLICATIONS

EPO, European Search Report and Annex to the European Search Report issued in EP Patent Application No. 15461571.0, dated Jan. 25, 2016, total 5 pages.

*Primary Examiner* — Chun Cheung

(74) *Attorney, Agent, or Firm* — Masuvalley & Partners

(57) ABSTRACT

The invention relates to a holder for sweets, having a funnel-shaped handle element and a tray disposed on an expanded part of the handle element, wherein the tray has recesses for containing sweets therein, whereas on ridges separating the individual recesses and/or on the periphery of the tray, spikes for impaling sweets thereon are disposed.

11 Claims, 8 Drawing Sheets

8 5 6 4 3 7 1 2

(56) References Cited

U.S. PATENT DOCUMENTS

| | | | | |
|---|---|---|---|---|
| 6,425,480 | B1 * | 7/2002 | Krueger | A47G 19/065 206/217 |
| 6,474,494 | B1 * | 11/2002 | Miller | A47G 19/065 206/217 |
| 8,298,598 | B2 | 10/2012 | Butts-Cornish | |
| 8,469,222 | B1 | 6/2013 | Stavitzski et al. | |
| 2007/0227919 | A1 * | 10/2007 | True | B65D 81/3216 206/219 |
| 2008/0257895 | A1 | 10/2008 | Broselow | |
| 2010/0307116 | A1 * | 12/2010 | Fisher | B65D 51/28 53/492 |
| 2012/0273373 | A1 * | 11/2012 | Wu | A47G 19/2205 206/217 |
| 2014/0367392 | A1 * | 12/2014 | McClinton | A47G 19/065 220/574 |

FOREIGN PATENT DOCUMENTS

| | | | |
|---|---|---|---|
| EP | 2 481 689 | A2 | 8/2012 |
| FR | 2 692 125 | A1 | 12/1993 |

* cited by examiner 3
6
8

7
2

HOLDER FOR SWEETS

The present invention claims priority to European Patent Application No. EP 15461571.0 filed Oct. 28, 2015 entitled HOLDER FOR SWEETS, which is incorporated herein by reference in its entirety.

TECHNICAL FIELD

The object of the invention is a holder for sweets, with a funnel-shaped handle element and a tray disposed on an expanded part of the handle element. The holder is intended for presentation and serving of sweets, in particular in the form of a bouquet created after wrapping the outside of the holder for sweets in a paper or foil.

PRIOR ART

Various types of containers or supports for presenting, storing or serving food products are known. They often have the form of trays, optionally fitted with a cover and handles.

For example, a food container provided with a handle intended for holding containers with food with one hand is known from FR2692125A1. This solution is intended primarily as an accessory for convenient eating of meals while standing, particularly when the container with food is very hot. Among numerous design variants, a set consisting of a funnel-shaped handle element and a round tray matched with its size and shaping of a circumferential protuberance on its edge to the shape of an expanded part of the handle element is disclosed. As the container is substantially intended for serving hot meals, sauces, etc., its use excludes, by definition, the possibility of excessive tilting because its content could then easily fall out through the circumferential protuberance on the edge of the tray.

In turn, from U.S. Pat. No. 8,298,598B2, a decorative holder for sweets in the shape of a flower with a long stem, the petals of which serve as supports for individual products, is known. Each petal is provided with a clip for holding the product on the surface of the petal even when the holder is tilted. However, due to the large number of components, preparation of this holder to be ready to use requires a labour-intensive assembly.

In turn, U.S. Pat. No. 8,469,222B1 describes a construction of a plastic tray for holding confectionery products, which is formed so that it is connected from the bottom to a stiffening tray, while from the top, it may be connected to a transparent plastic cover. In one of the presented variants, there is a possibility to provide the bottom of the recess designed to receive confectionery products with a projection or spike onto which confectionery product can be impaled, thereby fixing it in the recess.

A holder for the presentation of sweets in the form of a bouquet is known e.g. from community industrial design 002589812-0002. However, in this type of solutions, sweets are impaled on pointed sticks which can be dangerous especially for small children, creating the possibility of facial injury (e.g. when the car suddenly brakes) or esophageal injury (e.g. when a part of the stick breaks and is consumed together with the sweet). Moreover, during transport, the bouquet composed of sweets impaled on sticks, wrapped in a paper or foil, can relatively easily become deformed during transport. Additionally sweets impaled on sticks lose their taste qualities because wood of the sticks absorbs moisture from sweets, especially during prolonged storage.

SUMMARY OF THE INVENTION

The aim of the present solution is to overcome the above-mentioned problems, associated with the use of known solutions for the presentation of sweets, by providing a holder for sweets which allows, having been wrapped in a paper or foil, obtaining a bouquet form not being subject to easy deformations during transport, safe to children, and allowing the sweets to be maintained in place, in the composition planned, even during significant tilting of the tray.

Therefore, the object of the invention is a holder for sweets, having a funnel-shaped handle element and a tray disposed on an expanded part of the handle element, characterised in that the tray has recesses for containing sweets therein, whereas on ridges separating the individual recesses and/or on the periphery of the tray, spikes for impaling sweets thereon are disposed.

In one preferred embodiment, the holder according to the invention consists of the handle element and the tray, wherein each of these parts is formed as an integral plastic component. In another preferred embodiment, the expanded part of the handle element and the side of the tray opposite to the side provided with spikes are adapted with their shapes and dimensions to be connected to each other. In yet another preferred embodiment, the holder according to the invention consists of a handle element and a tray formed together as an integral plastic component. In a further preferred embodiment, the holder additionally comprises a cup-like supporting element located centrally between the handle element and the tray, for supporting the central part of the tray at the side facing the handle element, whereby the supporting element is positioned so that it is open towards the handle element. Preferably, the tray is round, oval, polygonal or in the form resembling a flower. In a still further preferred embodiment, both the recesses and the spikes are arranged symmetrically on the surface of the tray, thereby forming several concentric circles of different diameters. In another preferred embodiment, recesses located at different distances from the centre of the tray vary in depth. In another preferred embodiment, the central area of the tray is displaced relative to the plane defined by the edge of the tray periphery in the direction indicated by free ends of the spikes. In a further preferred embodiment, at least one recess is provided with a spike. In still a further preferred embodiment, the edge of the tray periphery is provided with a flexible tab. In another preferred embodiment, the tray is additionally covered, from the top, with a transparent foil. In a further preferred embodiment, the holder is additionally wrapped from the outside in a paper or foil, giving the whole the form of a bouquet.

Owing to the possibility of placing sweets in recesses of the tray and impaling them on spikes, the original position of sweets on the tray is maintained even if it is substantially tilted or subjected to vibrations, particularly during transport.

Elimination of separate long sticks, replaced by short spikes, substantially increases the safety of use of the holder according to the invention, especially for children, because with the use of short spikes forming an integral part of the tray, there is no risk of breaking the spike and consuming it together with the sweet. Plastic spikes do not absorb moisture from sweets impaled on them, and thus do not cause their excessive drying out.

The handle element and the tray are substantially rigid elements, which prevents deformation of the bouquet during transport. In addition, after unpacking, the tray can be used as a plate for serving sweets without having to move them to a separate support and with maintaining the original aesthetics of the original composition. Providing the edge of the tray periphery with a flexible tab facilitates removal of the tray from the handle element.

The possibility of giving the holder with sweets the form of a bouquet by wrapping it from the outside in a paper or foil, especially decorative one, allows the use of the invention for preparing compositions of sweets as an original and aesthetically attractive gift. The use of a foil covering the tray with sweets placed therein ensures the observance of hygiene requirements during transport and storage, and at the same time prevents drying out of sweets.

The tray provided with both recesses and spikes allows the preparation of compositions of both hard sweets, such as caramels and dragees which in principle are placed in recesses, and soft sweets (including marshmallows, jellies) which can be impaled on spikes. Appropriate arrangement of recesses and spikes allows protection of hard sweets against falling out when the tray is significantly tilted (once the protective foil is has been already removed) by soft sweets, impaled on the spikes, partially overlapping them from the top.

Further, optional use of a cup-like supporting element located centrally between the handle element and the tray allows to provide additional support for the central part of the tray from the side facing the handle element. This is especially convenient, when the tray is made of relatively thin (and thus elastic) sheet of plastic and the total weight of sweets located on the central part thereof is relatively high. In such case presence of such supporting element makes the entire system more resistant to undesired torsions or bending, that might deform the bouquet shape of the holder.

BRIEF DESCRIPTION OF THE DRAWINGS

Now, the invention will be presented in greater detail in a preferred embodiment, with reference to the accompanying drawings, in which:

FIG. 6 shows the holder according to the invention with sweets arranged on the tray 3 covered from the top with a foil, whereas

DETAILED DESCRIPTION OF THE PREFERRED EMBODIMENT

Figure 1:
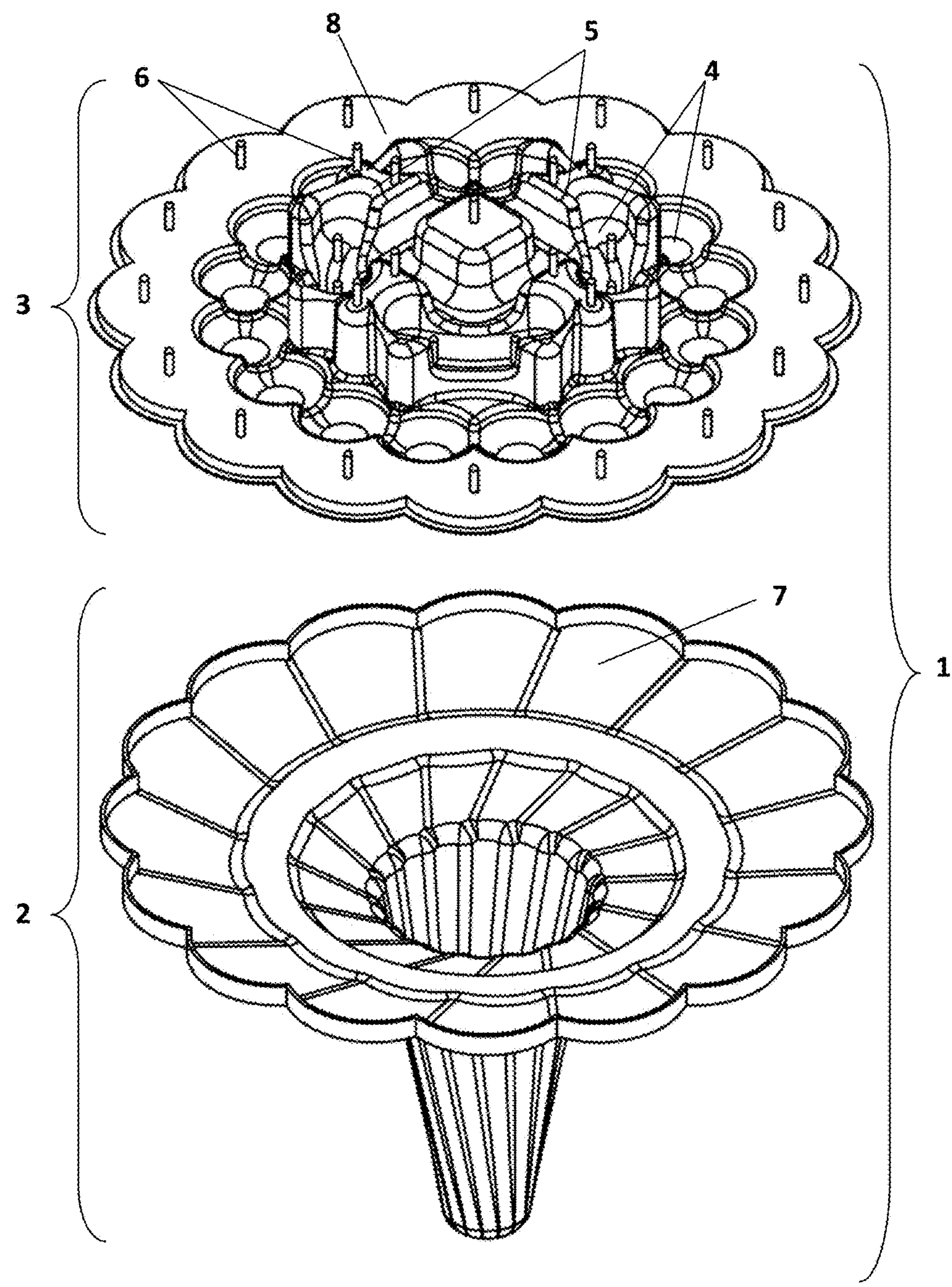
FIG. 1 shows a holder according to the first embodiment of the invention in an exploded view.

The first preferred embodiment of the holder 1 according to the invention, shown in FIG. 1, consists of two separate parts: a handle element 2 and a tray 3. The funnel-shaped handle element 2 has a gripping part integrally joined to an expanded part 7 which constitutes a base for the tray 3. In turn, the tray 3, also formed as a single integral element, has recesses 4 for placing sweets therein and spikes 6 for impaling sweets thereon, arranged on ridges 5 separating the individual recesses 4, as well as on a flat periphery 8 of the tray 3. The expanded part 7 of the handle element 2 and the side of the tray 3 opposite to the side provided with spikes 6 (i.e. the side of the tray 3 directed to the expanded part 7 of the handle element 2, when assembling and using the holder 1) are adapted with their shapes and dimensions to be connected to each other. Both the tray 3 and the expanded part 7 of the handle element 2 have the form resembling a flower with 16 petals.

Figure 2:
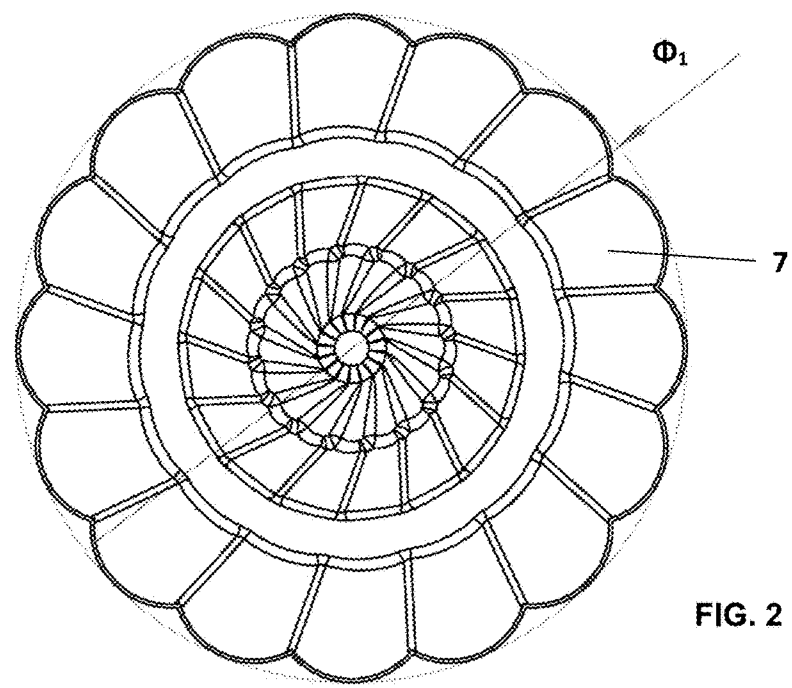
FIG. 2 shows a handle element 2 of the first embodiment in a top view.
Figure 3:
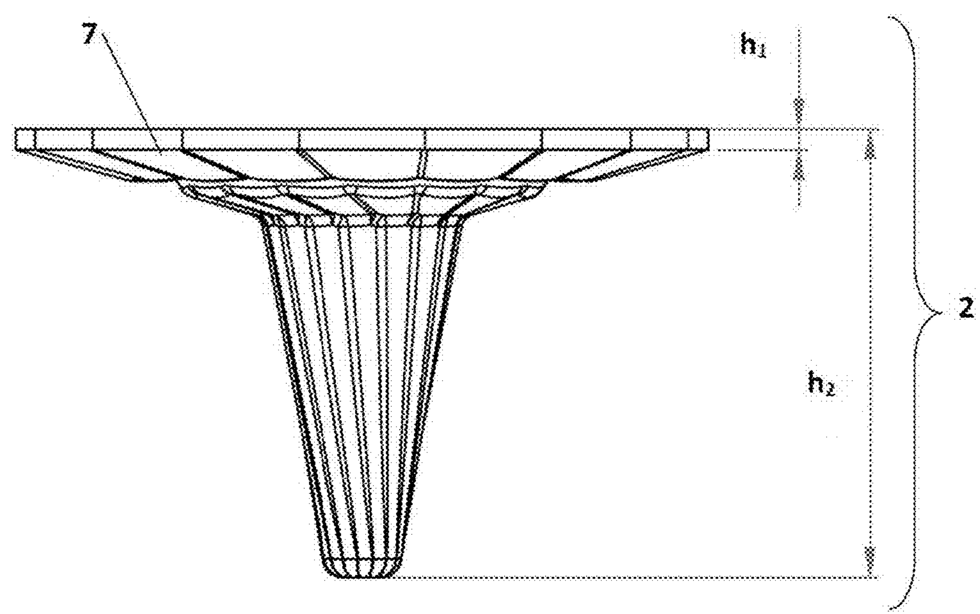
FIG. 3 shows the handle element 2 of the first embodiment in a side view.

The expanded part 7 of the handle element 2, shown in FIG. 2 in a top view, has a shape resembling a flower inscribed in a circle with a diameter $\phi_1$ which may be e.g. 154 mm. In turn, in FIG. 3, the same handle element 2 in a side view is shown. Height $h_1$ of a strip on the peripheral edge of the expanded part 7 of the handle element 2 may be e.g. 5 mm, and height $h_2$ of the whole handle element 2 may be e.g. 100 mm.

Figure 4:
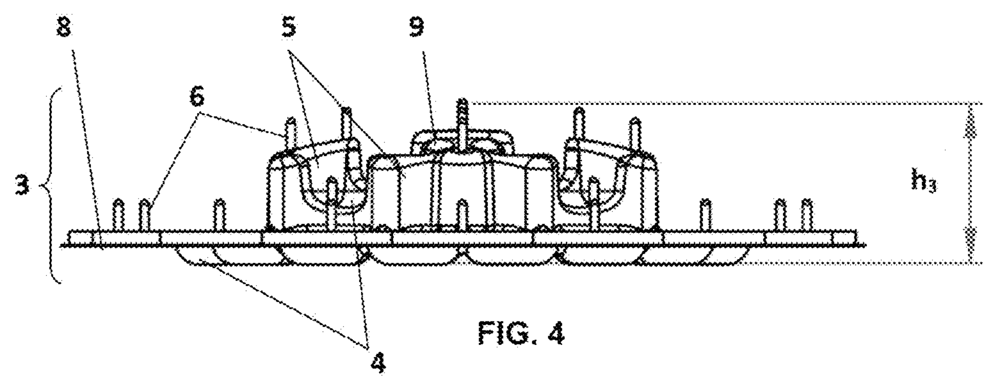
FIG. 4 shows a tray 3 of the first embodiment in a side view.
Figure 5:
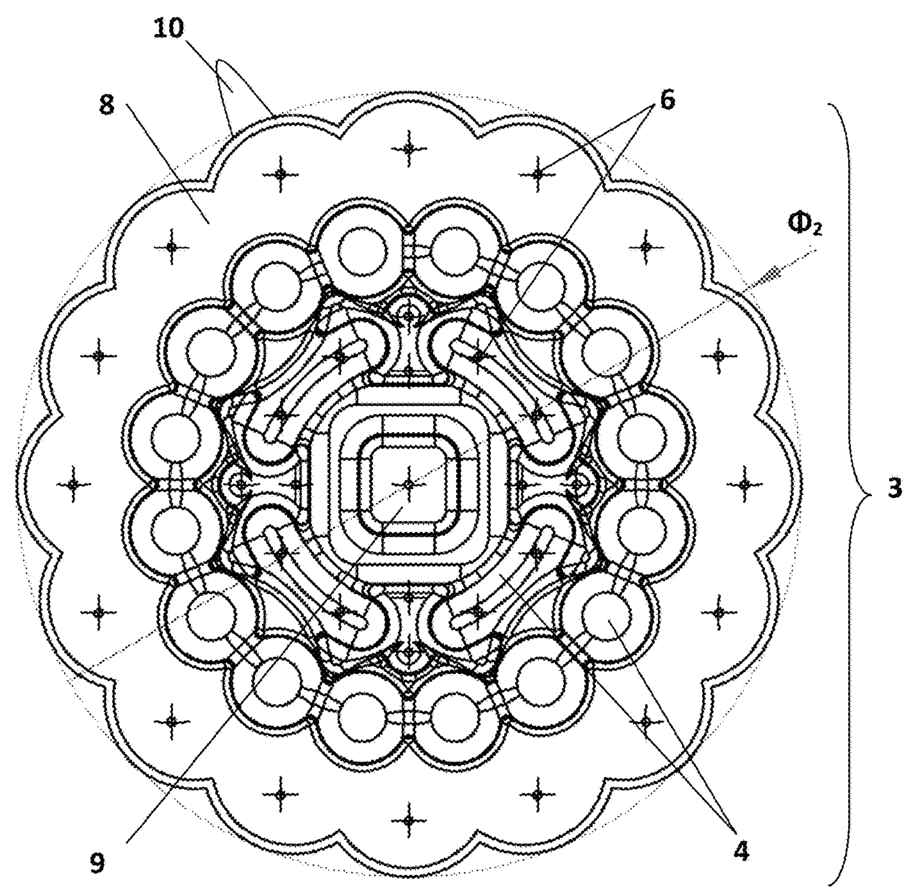
FIG. 5 shows the tray 3 of the first embodiment in a top view.

The tray 3 is shown in FIG. 4 in a side view, and in FIG. 5 in a top view. In addition to the elements already mentioned, the tray 3 has a central area 9 displaced relative to the plane defined by the edge of the periphery 8 of the tray 3 in the direction indicated by free ends of the spikes 6. Maximum height $h_3$ of the tray 3 measured from the bottom of the lowermost recess 4 to the free end of the uppermost spike 6 may be e.g. 30 mm. Diameter $\phi_2$ of the circle in which the shape of the periphery 8 of the tray 3, resembling a flower, is inscribed may be e.g. 152 mm. In FIG. 4, recesses 4 of various depths located at different distances from the centre of the tray 3 can be seen.

As shown in FIG. 5, both recesses 4 and spikes 6 are arranged symmetrically on the surface of the tray 3, thereby forming several concentric circles of different diameters. Each of the four longitudinal recesses 4 directly surrounding the central area 9 of the tray 3 is provided with two spikes 6. These narrow recesses are intended for attaching soft sweets therein in a lateral or oblique position, i.e. in a position tilted by an angle in the range of 0-90° relative to the position of sweets placed in wider recesses 4 devoid of spikes or impaled on spikes 6 arranged on ridges 5 separating the individual recesses 4, as well as on a flat periphery 8 of the tray 3. The edge of the periphery 7 of the tray 3 is provided with a flexible tab 10 projecting radially beyond the outer contour of the tray 3 and facilitating removal of the tray 3 from the expanded part 7 of the handle element 2.

Figure 6:
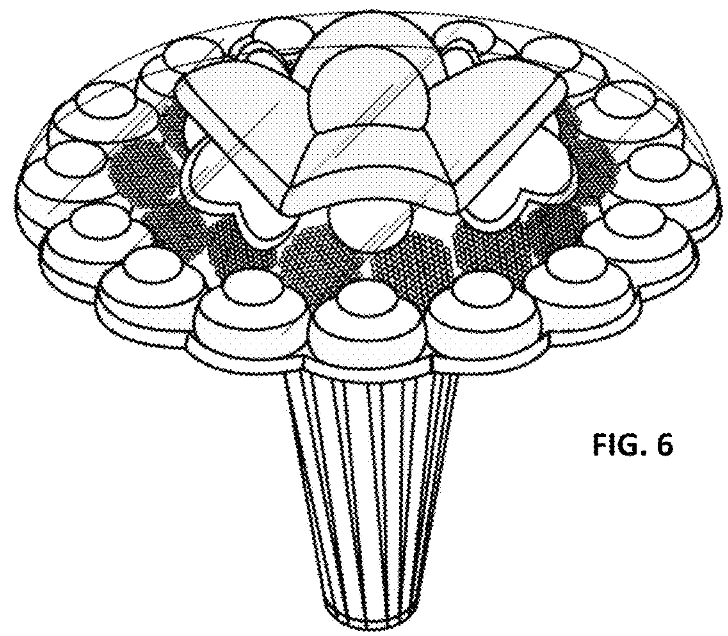
Figure 7:
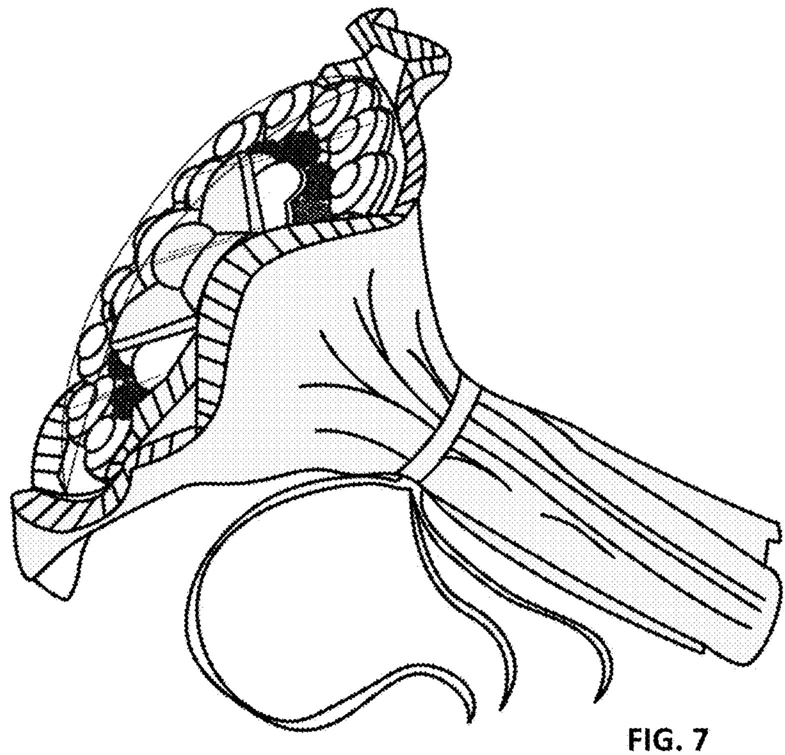
FIG. 7 shows the holder of FIG. 6 additionally wrapped from the outside in a paper which gives the whole the form of a bouquet.

FIG. 6 shows the holder 1 with sweets arranged on the tray 3 covered from the top with a transparent foil protecting the sweets from the contact with the environment during transport and all the time until the moment directly preceding their consumption. Optionally, the foil can be provided with a perforation allowing its easier removal by the end user. FIG. 7 shows the holder from FIG. 6 additionally wrapped from the outside in a decorative paper which gives the whole the form of a bouquet.

Figure 8:
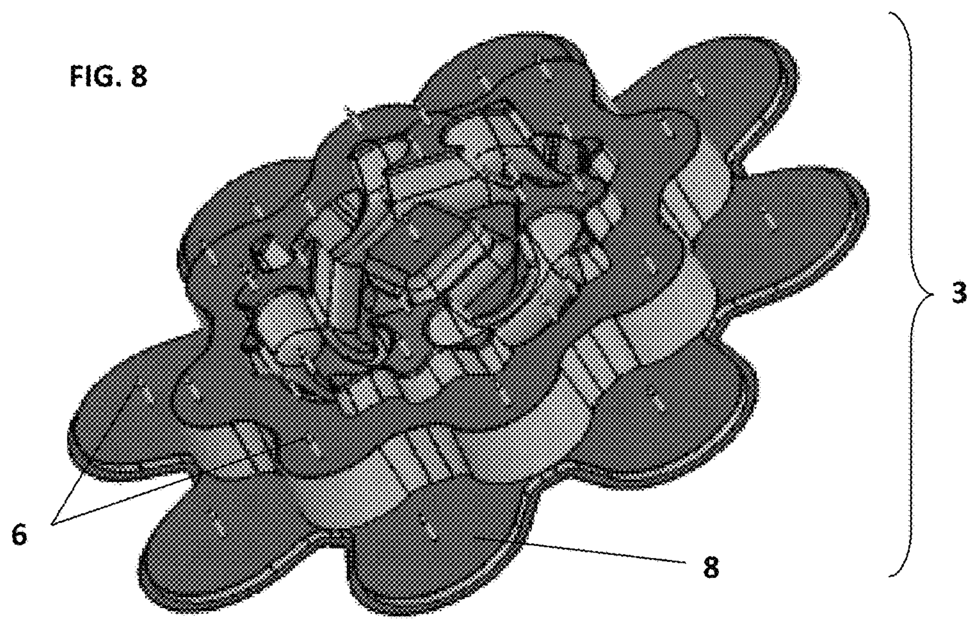
FIG. 8 shows the tray 3 of the second embodiment of the invention in a perspective view.
Figure 9:
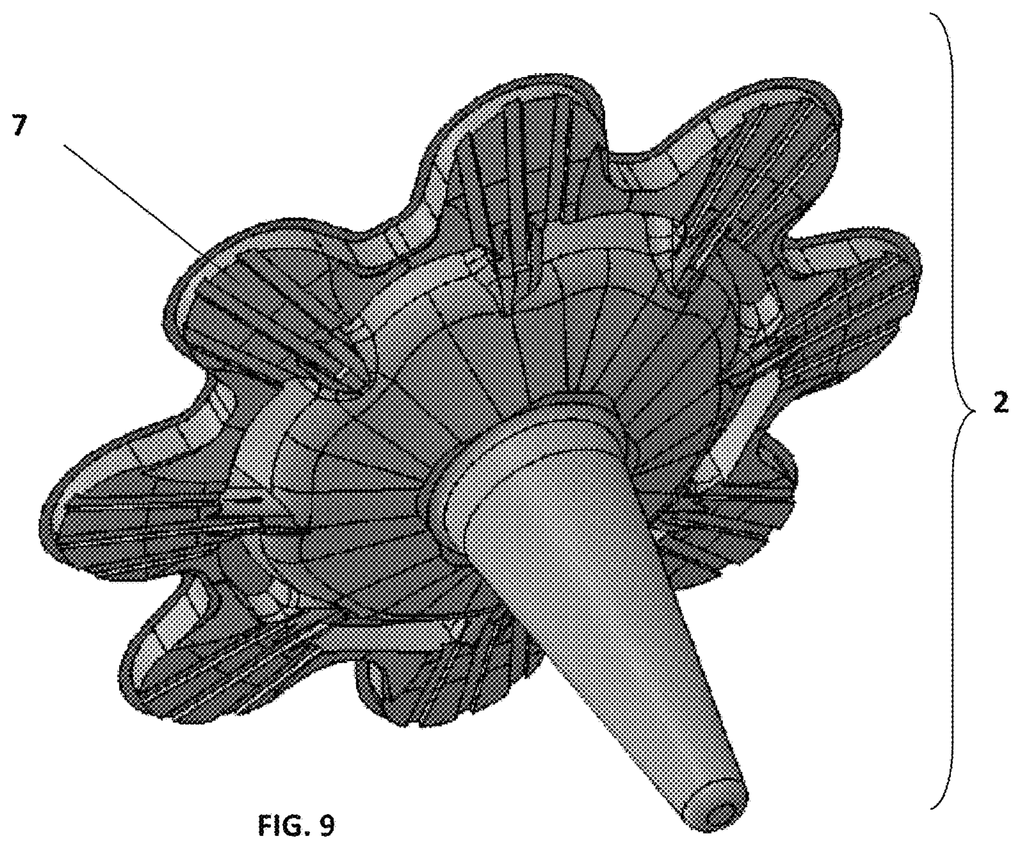
FIG. 9 shows the handle element 2 of the second embodiment in a perspective view.
Figure 10:
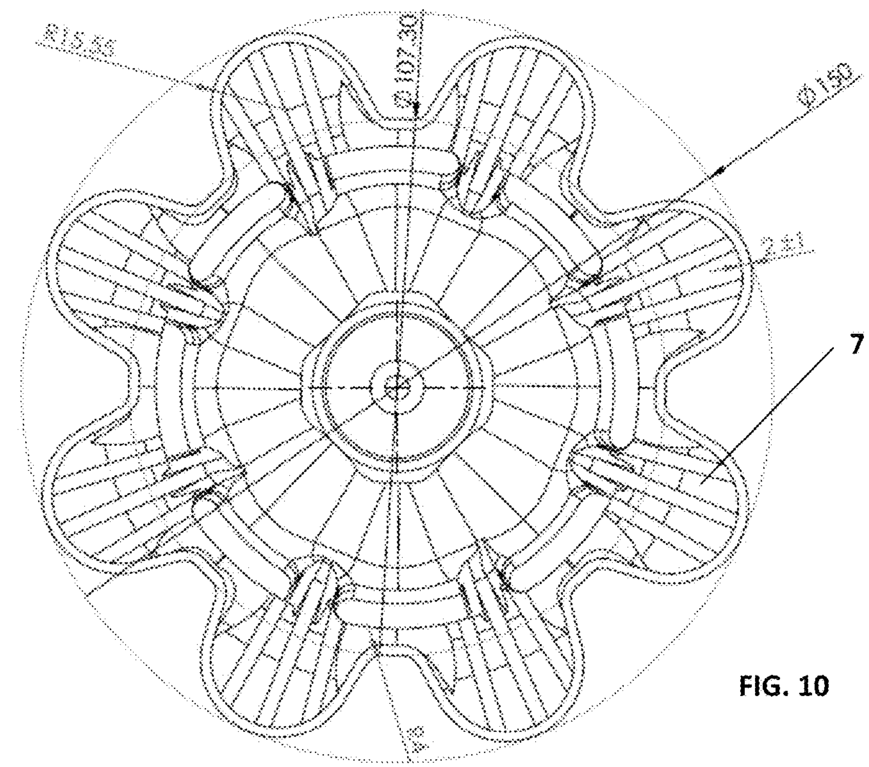
FIG. 10 shows a handle element 2 of the second embodiment in a top view.
Figure 11:
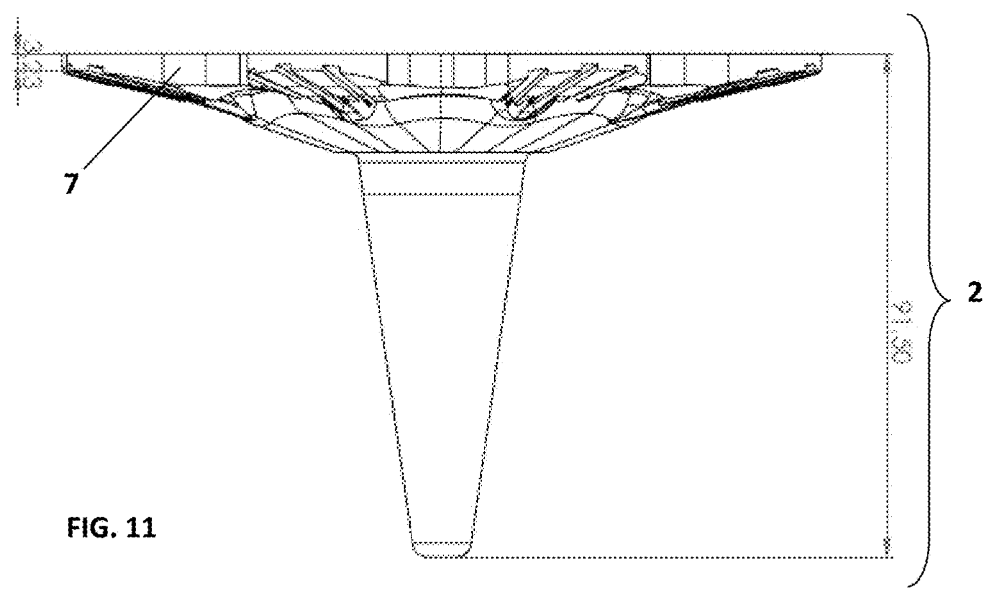
FIG. 11 shows a the handle element 2 of the second embodiment in a side view.
Figure 12:
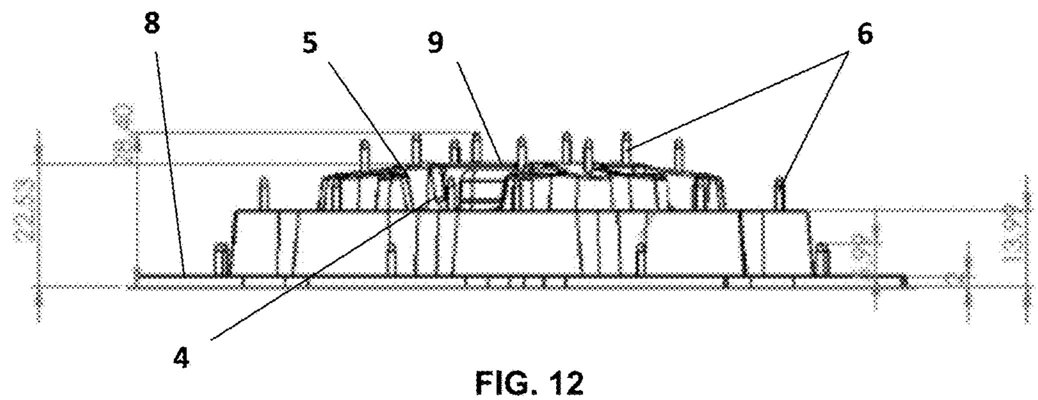
FIG. 12 shows a tray 3 of the second embodiment in a side view.
Figure 13:
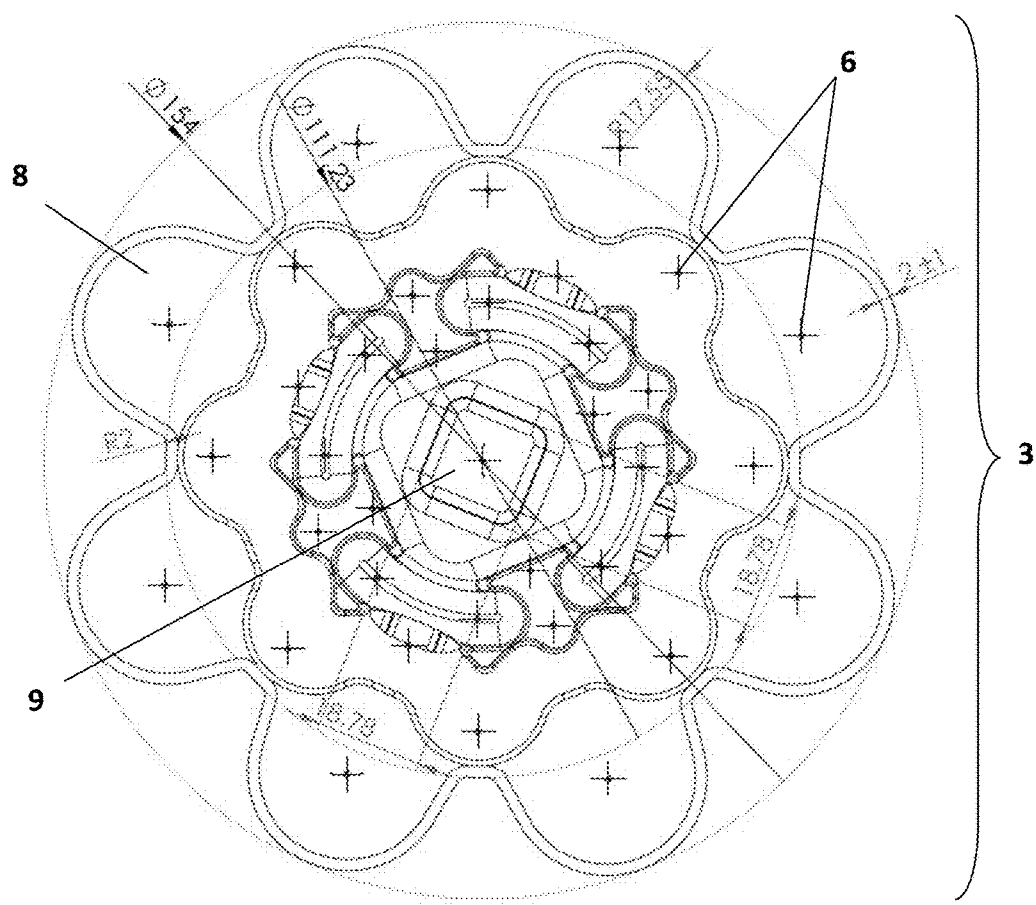
FIG. 13 shows the tray 3 of the second embodiment in a top view.
Figure 14:
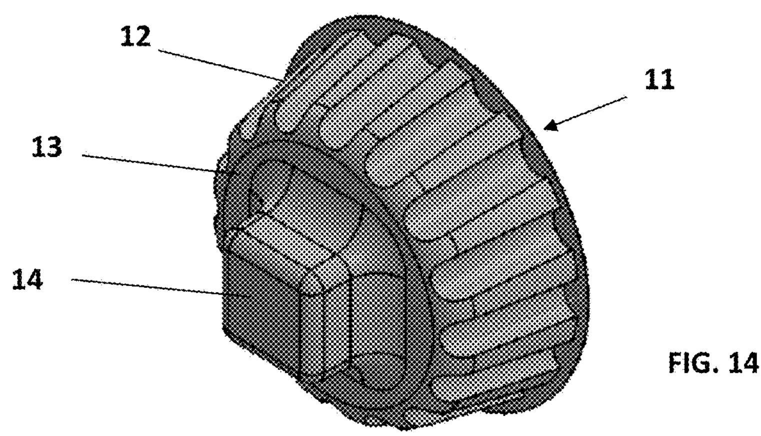
FIG. 14 shows a support element 11 of the second embodiment in a perspective view.
Figure 15:
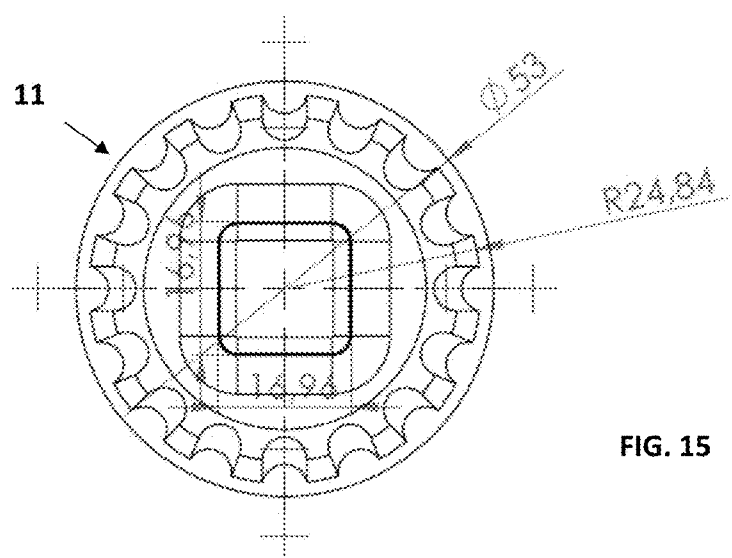
FIG. 15 shows the support element 11 of the second embodiment in a top view.
Figure 16:
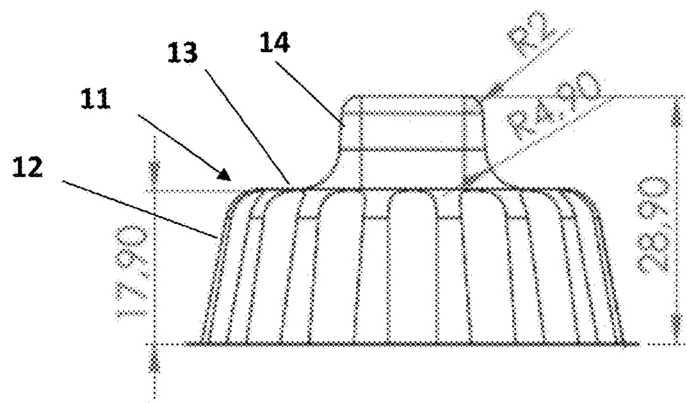
FIG. 16 shows the support element 11 of the second embodiment in a side view.

The second embodiment of the holder 1 according to the invention differs from the first embodiment mostly in that in addition to the handle element 2 and the tray 3 its includes the cup-like supporting element 11. These components of the second preferred embodiment of the holder 1 are presented in FIG. 8-16. Similar structural elements of the first and second embodiment of the holder 1 are defined by the same reference numbers. The tray 3 of the second embodiment is shown in FIGS. 8, 12 and 13, the handle element 2—in FIGS. 9, 10 and 11, and the supporting element 11—in FIGS. 14, 15 and 16. The supporting element 11 includes a peripheral side portion 12 and a bottom portion 13. The peripheral side portion 12 and the bottom portion 13 together define cup-like hollow space. As shown in FIGS. 14 and 16 the bottom portion 13 may be provided with a further protrusion 14 extending outwardly therefrom.

In the assembled state of the holder 1 the supporting element 11 is located centrally between the handle element 2 and the tray 3, with its bottom portion 13 facing the central part of the tray 3 and with its open hollow space facing the handle element 2.

The invention claimed is:

1. A holder for sweets, having a funnel-shaped handle element and a tray disposed on an expanded part of the handle element, characterised in that the tray has a plurality of recesses for containing sweets therein, whereas a plurality of spikes for impaling sweets thereon are provided either on a plurality of ridges on ridges separating the individual plurality of recesses or on a tray periphery, or on both the ridges and the tray periphery;

wherein both the recesses and the spikes are arranged symmetrically on a surface of the tray, thereby forming a plurality of concentric circles of different diameters; and a tray central area is elevated relative to a plane defined by a tray periphery edge in a direction indicated by a plurality of ends of the spikes.

2. The holder according to claim 1, wherein the holder consists of the handle element and the tray, wherein each of these parts is formed as an integral plastic component.

3. The holder according to claim 1, wherein an expanded part of the handle element and the side of the tray opposite to the side provided with spikes are adapted with their shapes and dimensions to be connected to each other.

4. The holder according to claim 1, wherein the holder consists of the handle element and the tray formed together as an integral plastic component.

5. The holder according to claim 1, wherein the holder additionally comprises a cup-like supporting element located centrally between the handle element and the tray, for supporting the central part of the tray at a side facing the handle element, whereby the supporting element is positioned so that it is open towards the handle element.

6. The holder according to claim 1, wherein the tray is round, oval, polygonal or in the form resembling a flower.

7. The holder according to claim 1, wherein the plurality of recesses that are located at a plurality of different distances from a center of the tray vary in a depth.

8. The holder according to claim 1, wherein at least one recess is provided with a spike.

9. The holder according to claim 1, wherein the edge of the periphery of the tray is provided with a flexible tab.

10. The holder according to claim 1, wherein the tray is additionally covered with a transparent foil.

11. The holder according to claim 1, wherein the holder is additionally wrapped in a paper or foil, giving a form of a bouquet.

* * * * *

UNITED STATES PATENT AND TRADEMARK OFFICE

CERTIFICATE OF CORRECTION

PATENT NO. : 10,106,314 B2
APPLICATION NO. : 15/261793
DATED : October 23, 2018
INVENTOR(S) : Piotr Wnuk It is certified that error appears in the above-identified patent and that said Letters Patent is hereby corrected as shown below:

In the Claims

Column 5 and 6 should read:
1. A holder for sweets, having a funnel-shaped handle element and a tray disposed on an expanded part of the handle element, characterised in that the tray has a plurality of recesses for containing sweets therein, whereas a plurality of spikes for impaling sweets thereon are provided either on a plurality of ridges separating the plurality of recesses or on a tray periphery, or on both the ridges and the tray periphery;
wherein both the recesses and the spikes are arranged symmetrically on a surface of the tray, thereby forming a plurality of concentric circles of different diameters; and
a tray central area is elevated relative to a plane defined by a tray periphery edge in a direction indicated by a plurality of ends of the spikes.

Signed and Sealed this
Twenty-fifth Day of December, 2018

Andrei Iancu
*Director of the United States Patent and Trademark Office*